United States Patent [19]

Iwata et al.

[11] 4,379,954

[45] Apr. 12, 1983

[54] LEVER OPERATED PLURAL SWITCH ASSEMBLY

[75] Inventors: Masayosi Iwata, Hashima; Harumi Douke, Komaki; Yoshikazu Hayashi, Gifu; Tadashi Yokoyama, Kuwana; Yukio Mizuta, Nishi, all of Japan

[73] Assignee: Kabushiki Kaisha Tokai Rika Denki Seisakusho, Aichi, Japan

[21] Appl. No.: 199,214

[22] Filed: Oct. 21, 1980

[30] Foreign Application Priority Data

Oct. 24, 1979 [JP] Japan ............................ 54-147425[U]

[51] Int. Cl.³ .......................... H01H 9/00; H01H 3/16
[52] U.S. Cl. ..................................... 200/4; 200/61.27; 200/61.54
[58] Field of Search ...................... 200/4, 61.27, 61.3, 200/61.54

[56] References Cited

U.S. PATENT DOCUMENTS

| | | | |
|---|---|---|---|
| 3,766,351 | 10/1973 | Cryer | 200/61.27 X |
| 3,934,101 | 1/1976 | Jones | 200/61.27 X |
| 4,219,706 | 8/1980 | Koch et al. | 200/4 |
| 4,293,743 | 10/1981 | Iwata et al. | 200/61.27 X |

*Primary Examiner*—J. R. Scott
*Attorney, Agent, or Firm*—Wenderoth, Lind & Ponack

[57] ABSTRACT

An improved combination switching arrangement for use in a motor vehicle or the like includes a plurality of actuators to be displaced by operation of a control lever, and a switch unit having a switch base on which switch elements to be selectively opened or closed by the movements of the actuators are fixed. The switch elements are disposed on the upper surface and the under surface of the switch base, while at least one set of the actuators are movably provided at the upper and under surfaces of the switch base so as to be connected to each other through an opening formed in the switch base for simple construction and compact size of the switching arrangement.

8 Claims, 25 Drawing Figures

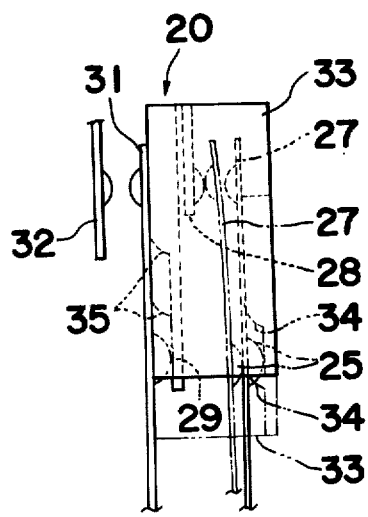
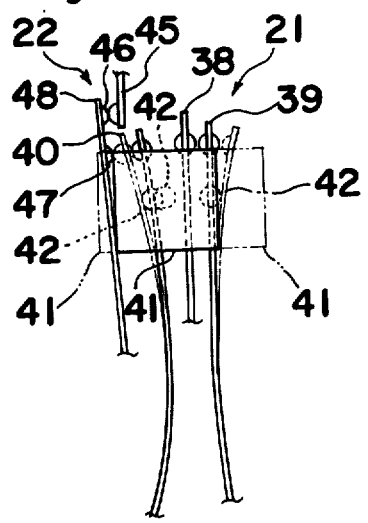
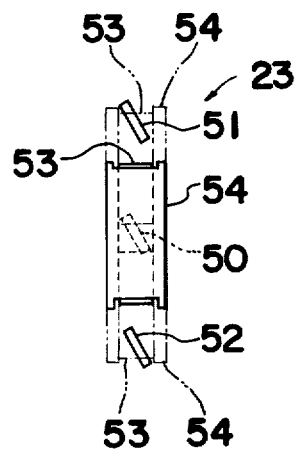
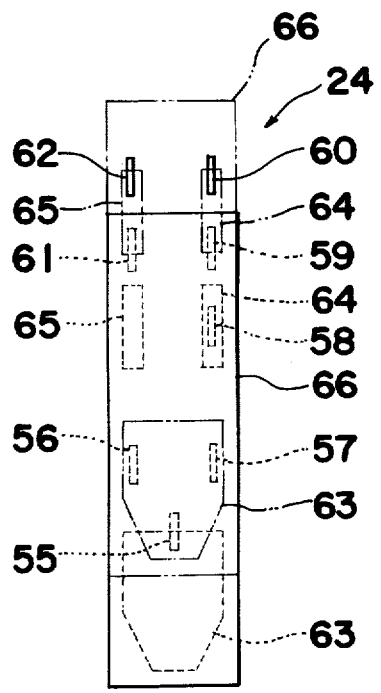

LEVER OPERATED PLURAL SWITCH ASSEMBLY

BACKGROUND OF THE INVENTION

The present invention generally relates to an electrical switch and more particularly, to a combination switching arrangement for use in a motor vehicle and the like which is capable of controlling functions of a plurality of switching members through operation of a control lever.

Conventionally, in a switching arrangement of the above described type, it has been a general practice that, for facilitation of mounting and assembly work during manufacture, a plurality of switching members, for example, a light switch, a dimmer switch, a passing switch, a turn signal switch, a hazard switch, a retractor switch, etc., each having an inherent role, are formed into a unit with the use of actuators corresponding to the respective switching members and a switch base on which switch elements such as terminals, contact pieces, contacts, etc., are fixedly disposed for selective opening and closing of the switching members by the actuators. However, in the known arrangement as described above, the switch base tends to be large in size due to an increase in the number of switching members to be incorporated therein, and thus, the resultant switching arrangement not only is complicated in construction, but undesirably occupies a large amount of space when installed in a motor vehicle.

SUMMARY OF THE INVENTION

Accordingly, an essential object of the present invention is to provide a combination switching arrangement for use in a motor vehicle and the like in which the size of a switch base is reduced to provide a compact switch unit occupying only a relatively small amount of space when installed in motor vehicles.

Another important object of the present invention is to provide a combination switching arrangement of the above described type which is simple in construction and stable in function, with high reliability, and which can be readily manufactured on a large scale at low cost.

In accomplishing these and other objects, according to one preferred embodiment of the present invention, there is provided a combination switching arrangement for use in a motor vehicle and the like which includes a support frame, a control lever member rotatably provided on the support frame for pivotal movement about a first support axis together with a third actuating member for direction indication, and about a second support axis directed in a direction different from that of the first support axis together with a second actuating member for dimmer and passing indication, and also for rotation about the own axis thereof together with a first actuating member for lighting control and head lamp retractor control, and a switch unit detachably mounted on the support frame and having a switch base in which a plurality of switch elements to be selectively opened and closed through movements of corresponding actuating pieces associated with the first, second and third actuating members, are provided. The switch elements are positioned on a first one surface and on a second surface of the switch base, with at least one set of the actuating pieces for light control and head lamp retractor control being movably disposed on the first and the second surfaces of the switch base for connection between the one set of actuating pieces through a communicating portion formed in the switch base.

By the arrangement according to the present invention as described above, a compact combination switching arrangement simple in construction and accurate in functioning has been advantageously presented with high dependability, with substantial elimination of disadvantages inherent in the conventional switching arrangement of this kind.

BRIEF DESCRIPTION OF THE DRAWINGS

These and other objects and features of the present invention will become apparent from the following description taken in conjunction with the preferred embodiment thereof with reference to the accompanying drawings, in which:

FIG. 14 is a fragmentary diagram explanatory of the functions of light switch elements employed in the switch unit of FIG. 6, FIG. 15 is a fragmentary diagram explanatory of the functions of dimmer and passing switch elements employed in the switch unit of FIG. 6, FIG. 16 is a fragmentary diagram explanatory of the functions of turn signal switch elements employed in the switch unit of FIG. 6, FIG. 17 is a fragmentary diagram explanatory of the functions of hazard switch elements employed in the switch unit of FIG. 6.

DETAILED DESCRIPTION OF THE INVENTION

Figure 1:
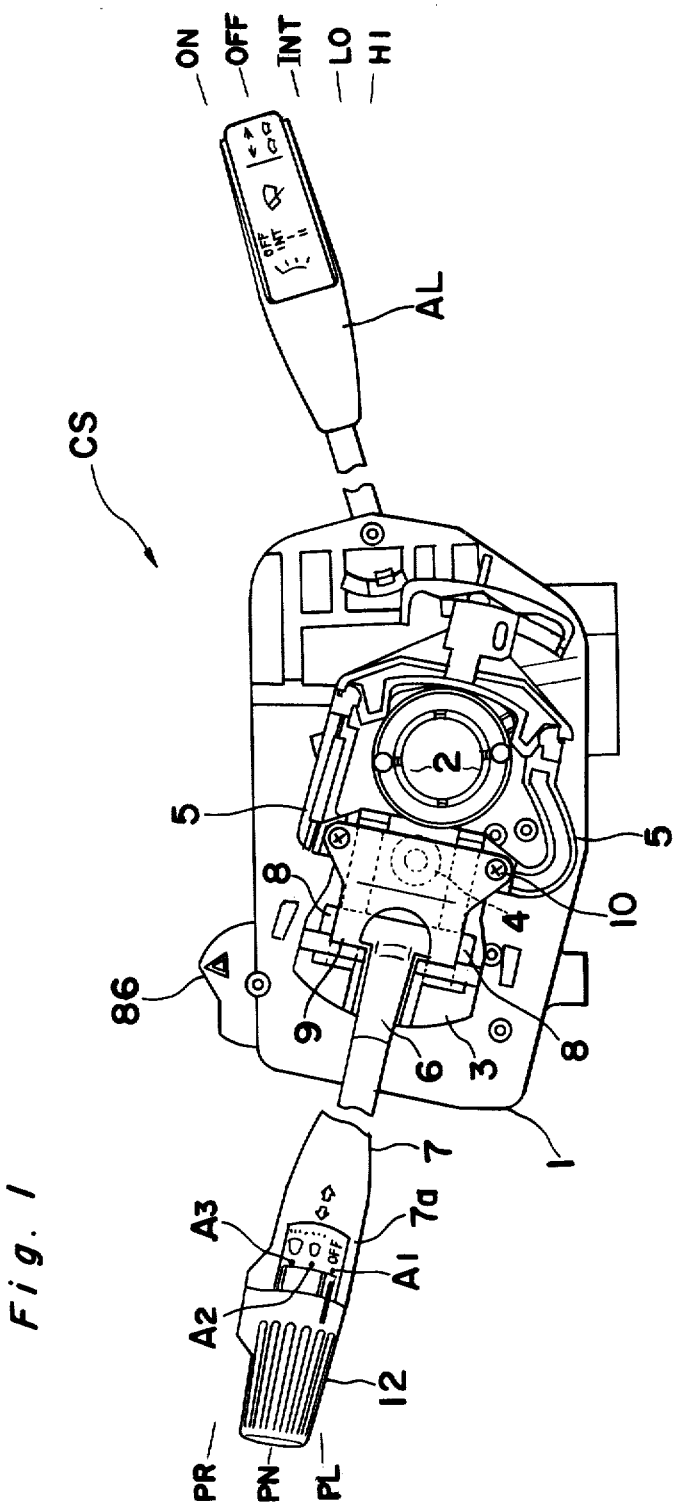
FIG. 1 is a top plan view of a combination switching arrangement to which the present invention may be applied.

Before the description of the present invention proceeds, it is to be noted that like parts are designated by like reference numerals throughout the several views of the accompanying drawings.

Referring now to the drawings, there is shown in FIGS. 1 to 19 a combination switching arrangement CS according to one preferred embodiment of the present invention. In FIGS. 1 to 4, the combination switching arrangement CS generally includes a support frame or column body 1 having a bore or opening 2 for receiving therein a steering shaft (not shown) and secured at a front part of a driver's seat (not shown) in a known manner, a lever holding member or bracket 3, for example of plastic or other insulative type material, rotatably coupled, at its through-opening 4a, around a hollow support stud 4 integrally formed with the support frame 1 in a position adjacent to opening 2 and having corresponding arms 5 laterally, outwardly extending therefrom, and a lever connecting member 6 to which a hollow control lever 7 is connected to be one unit therewith and which has a pair of supporting shafts 8 laterally, outwardly extending therefrom, with the supporting shafts 8 being received in corresponding recesses (not shown) formed at the upper face of bracket 3, while the lever connecting member 6 is prevented from falling off the bracket 3 by a plate-like metal piece 9 fixed to the upper face of the lever support member 3 by fixing screws 10 (FIG. 2).

Figure 4:
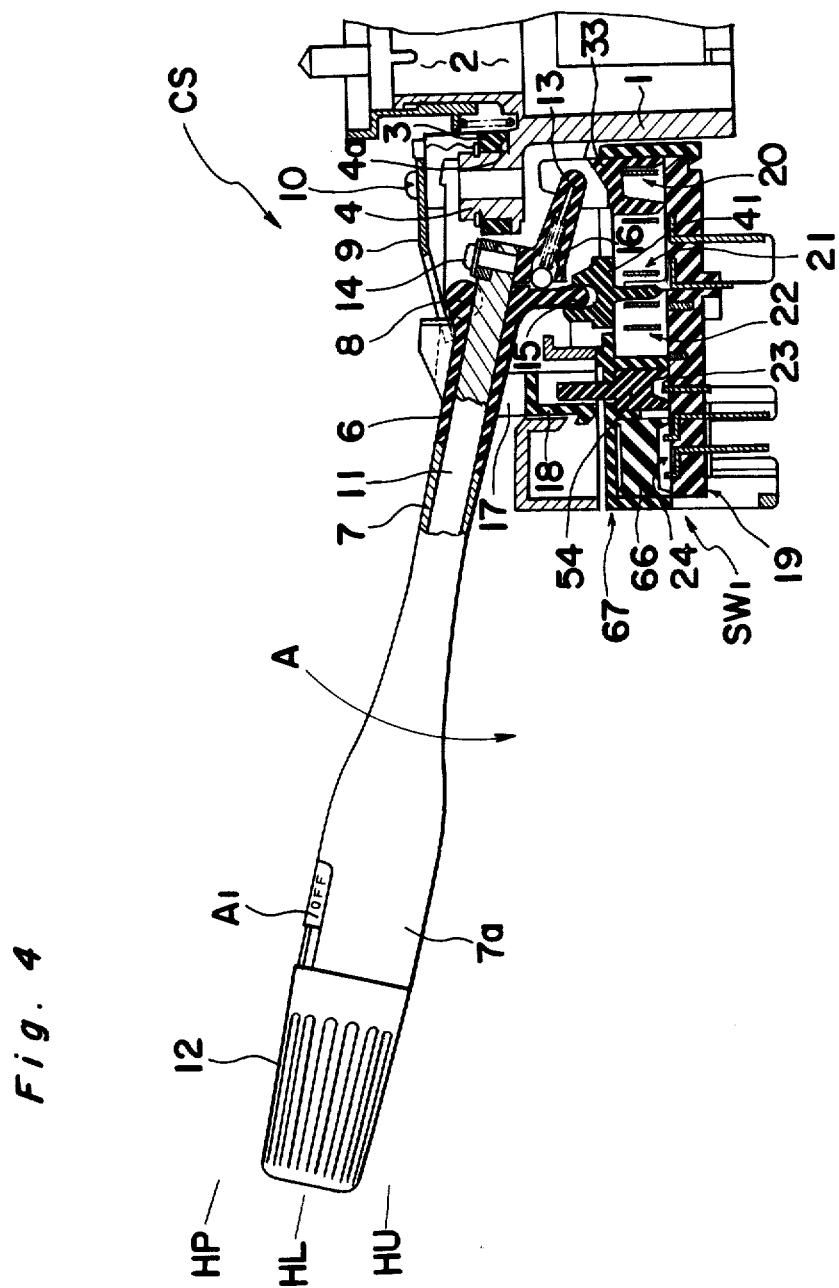
FIG. 4 is a fragmentary side sectional view of the portion of FIG. 3.

Meanwhile, as shown in FIG. 4, a control shaft 11 is rotatably passed through the hollow interiors of the control lever 7 and lever connecting member 6, and at one end of the control shaft 11 extending outwardly from a grip portion 7a of the control lever 7, there is fixed a knob 12 for lighting control, while at the other end of control shaft 11 projecting outwardly from the corresponding end of the connecting member 6, a first actuating member 13 is connected by a screw 14 so as to extend in a parallel relation with respect to control shaft 11. Therefore, the first actuating member 13 as described above is arranged to be rotated together with the control shaft 11 as control shaft 11 is turned by the knob 12, and may be set to corresponding positions as an index A provided on the knob 12 is selectively aligned, for example, with an OFF position A1, a small lamp position A2 and a head lamp position A3, while the respective set positions are maintained by a known detent mechanism 16 provided between the first actuating member 13 and a second actuating member 15 which is integrally formed with the undersurface of the lever connecting member 6. Furthermore, the lever holding member 3 is integrally formed with a third actuating member 18 having a U-shaped groove 17. In the above arrangement, when the control lever 7 is turned for operation in a direction of or against the arrow A in FIG. 4, it is rotated about the support shafts 8 together with the lever connecting member 6, and consequently with the second actuating member 15, and thus, for example, the dimmer and passing operations are effected. The control lever 7 is arranged to be retained either at a low beam position HL or a high beam position HU for head lamps by a known detent mechanism (not particularly shown), and also to be repeatedly rotated for operation between the low beam position HL and a passing indication position HP through an automatic restoration function by a suitable means (not shown).

Figure 3:
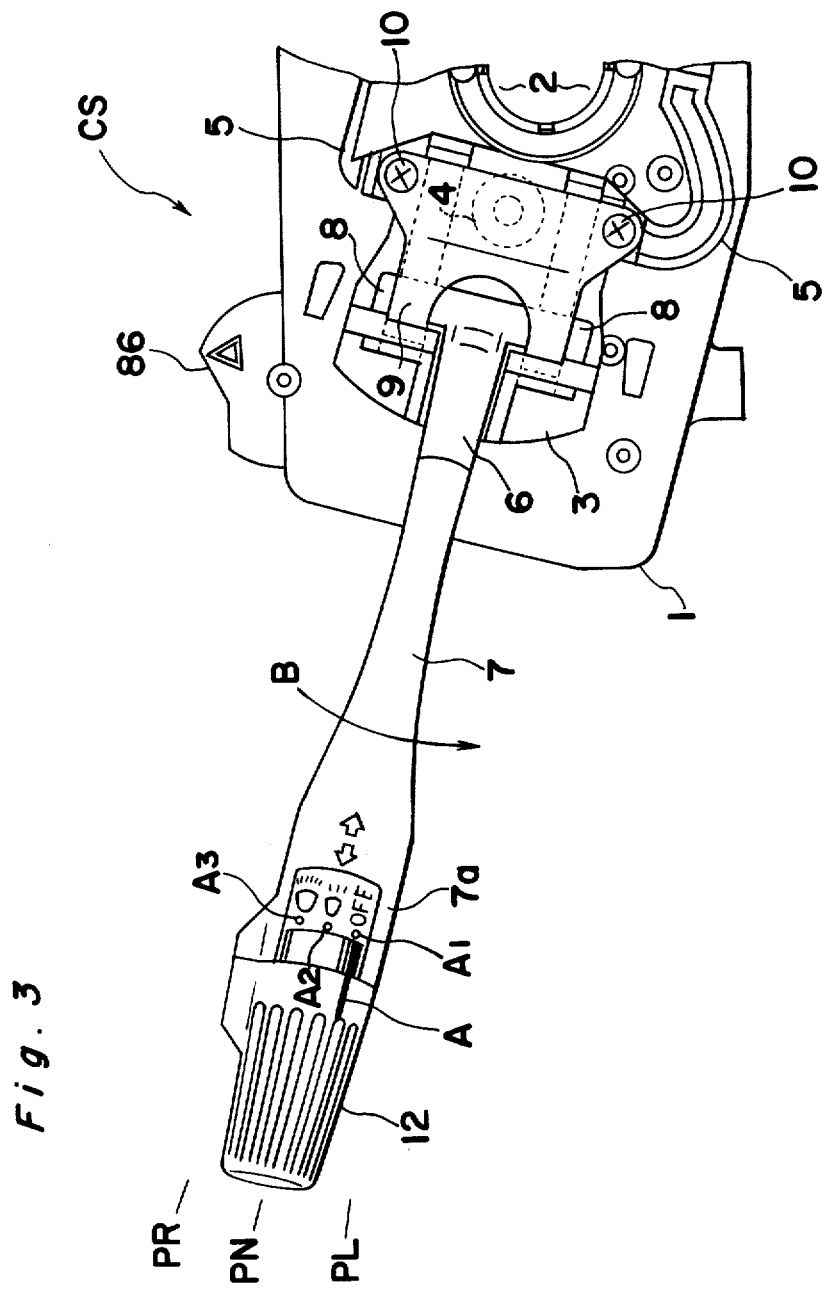
FIG. 3 is a fragmentary top plan view showing, on an enlarged scale, the main portion of the switching arrangement of FIG. 1.

Meanwhile, when the control lever 7 is rotated between a neutral position PN and a left turn indication position PL, and between the neutral position PN and a right turn indication position PR through lateral operation thereof in the direction of or against the arrow B, i.e. in the downward or upward directions in FIG. 3, the bracket 3 is also rotated about the support stud 4 together with third actuating member 18, and is retained at any of the neutral position PN, left turn indication position PL and right turn indication position PR by a known detent mechanism (not particularly shown). In the above state, when the control lever 7 is rotated vertically, i.e. in the direction of or against the arrow A in FIG. 4, the shafts 8 are independently rotated about the bracket, while the bracket 3 is retained at any of the neutral position PN, left turn indication position PL, and right turn indication position PR as described above.

Figure 2:
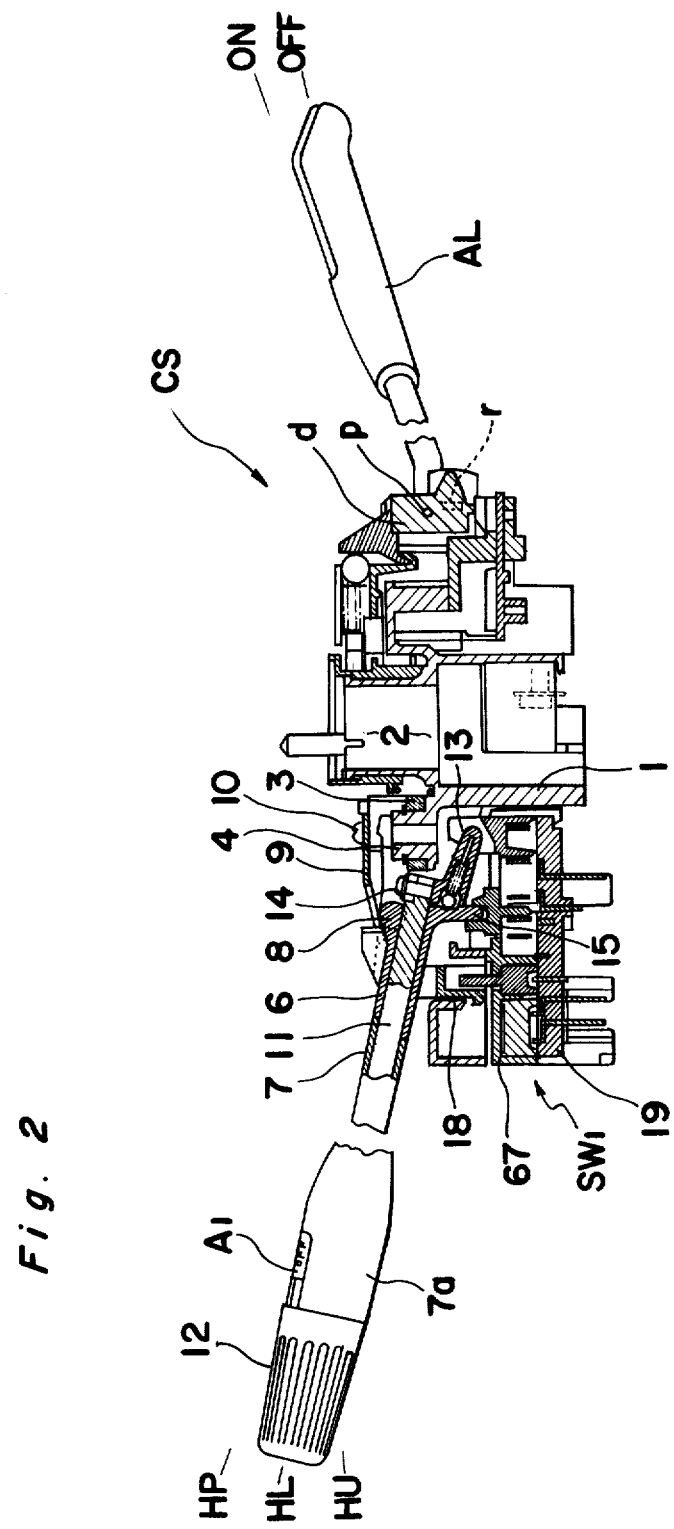
FIG. 2 is a side sectional view of the combination switching arrangement of FIG. 1.

On the other hand, at the right side of the switching unit CS in FIG. 1 and 2, there is provided an auxiliary lever AL associated with a suitable switch means (not shown) for controlling, for example, wiper and washer mechanisms (not shown), which lever AL is connected to a shaft member d provided at the right side edge (FIGS. 1 and 2) of the support frame 1 through a pin p so as also to be rotatable in the upward and downward directions in FIG. 2. The shaft member d as described above is further provided with a depressing rod r which is to be depressed downwardly by the auxiliary lever AL when lever AL is rotated from an OFF position to an ON position in FIG. 2 for washer control.

Meanwhile, in FIG. 1, when the auxiliary lever AL is set at a position INT, wipers (not shown) are driven intermittently at predetermined time intervals for wiping, and upon setting of the lever AL at a position LO, the wipers are operated at a low speed, while upon setting of lever AL at a position HI, the wipers are driven at high speed for wiping. Since the known circuit arrangement of the switch means referred to above is not directly related to the present invention and is described, for example, in detail in Japanese Utility Model Application Jikkaisho No. 54-42525 applied for by the same applicant as in the present invention, a detailed description thereof is abbreviated herein for brevity.

Referring also to FIGS. 5 to 19, a switch unit SW1 detachably mounted, for example, by fixing screws 83, 84 and 85 (FIG. 5) to the under surface of the support frame 1 in a position corresponding to the control lever 7 for association therewith, will be described hereinbelow. The switch unit SW1 generally includes a switch base 19 of electrically insulating material, for example, synthetic resin having switch elements such as a light switch 20, a dimmer switch 21, a passing switch 22, a turn signal switch 23, a hazard switch 24, etc. incorporated therein, and a switch cover 67 which are combined with each other to constitute switch unit SW1.

Figure 7:
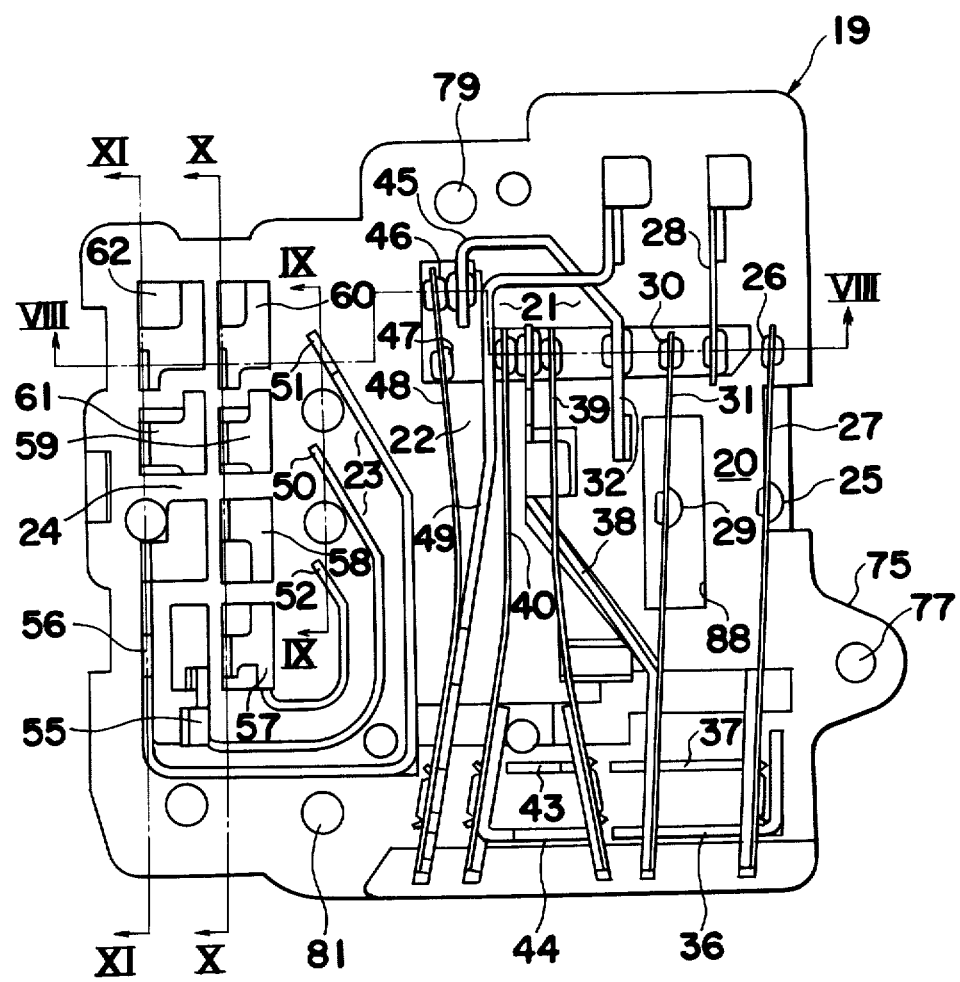
FIG. 7 is a top plan view of a switch base for the switch unit of FIG. 6, with a switch cover removed for clarity.
Figure 8:
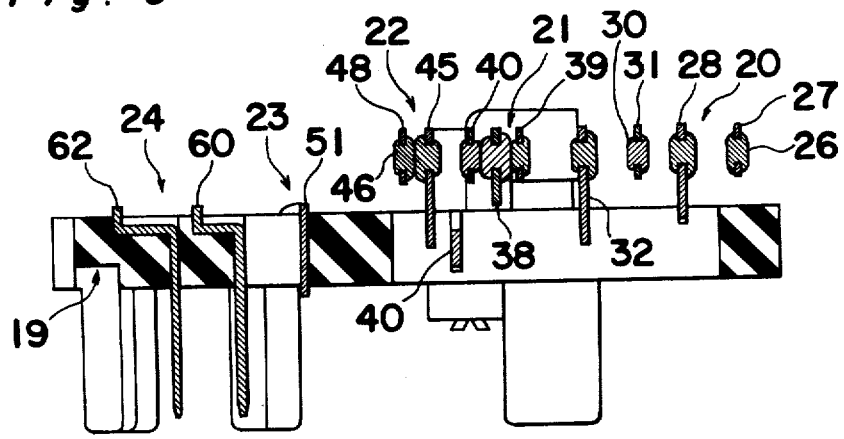
FIG. 8 is a cross sectional view taken along the line VIII—VIII in FIG. 7.
Figure 9:
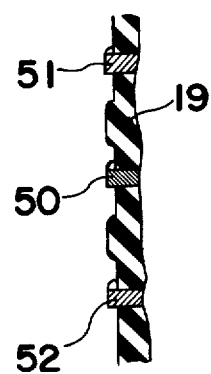
FIG. 9 is a cross sectional view taken along the line IX—IX in FIG. 7.

In FIGS. 6 to 11 showing the detailed construction of the respective switch elements as referred to above, the light switch 20 includes a movable contact plate 27 for small lamps having a contact 26 at its end and a contact piece 25 at its intermediate portion, and a corresponding stationary contact plate 28, a movable contact plate 31 for head lamps having a contact 30 at its end and a contact piece 29 at its intermediate portion and a corresponding stationary contact plate 32, and an actuating piece 33 movably provided in a vertical direction in FIG. 14 for actuating the above switch elements, actuating piece 33 being provided with projections 34 and 35 which are to contact the respective contact pieces 25 and 29 of the movable contact plates 27 and 31 and which are staggered in positions with respect to the direction of vertical movement of actuating piece 33 in FIG. 14. The movable contact plate 27 is arranged to be connected to the small lamps through a terminal plate 37 provided adjacent to a terminal plate 36 for the horn (FIG. 7), while the stationary contact plate 28 is adapted to be connected to a power source (not shown). On the other hand, the dimmer switch 21 is composed of a stationary contact plate 38 fixedly connected with the movable contact plate 31 of the light switch 20 for extension, a movable contact plate 39 for the low beam and a movable contact plate 40 for the high beam provided at opposite sides of the stationary contact plate 38 so as to correspond therewith, and a actuating piece 41 laterally movable in FIG. 15 for actuating the above switch elements in the manner as described later. The actuating piece 41 located between the movable contact plates 39 and 40 has a projection 42 effective for both the contacts plates 39 and 40. Moreover, the movable contact plate 39 for the low beam is arranged to be connected to the low beam side of the head lamps through a terminal plate 43, while the movable contact plate 40 for the high beam is adapted to be connected to the high beam side of the head lamps through a terminal plate 44 (FIG. 7).

The passing switch 22 is arranged to simultaneously utilize the above dimmer switch 21 and its high beam movable contact plate 40 and actuating piece 41 particularly in the present embodiment, and further includes a stationary contact plate 45 integrally formed with the head lamp stationary contact plate 32 of the above light switch 20, and a movable contact plate 48 having contacts 46 and 47 respectively at its end and intermediate portion so as to correspond to stationary contact plate 45 and also to the movable contact plate 40 as described above, with a terminal plate 49 being fixedly connected to movable contact plate 48 so as to be further connected to the power source. Therefore, the movable contact plate 48 normally contacts the stationary contact plate 45 through the contact 46 provided at its end, and thus, the power from the terminal plate 49 is supplied to the stationary contact plate 32 of the light switch 20 through contact between movable contact plate 48 and fixed contact plate 45, while being supplied, upon contact of the movable contact plate 31 with the stationary contact plate 32, to the stationary contact plate 38 of the dimmer switch 21 through contact plates 32 and 31.

Figure 10:
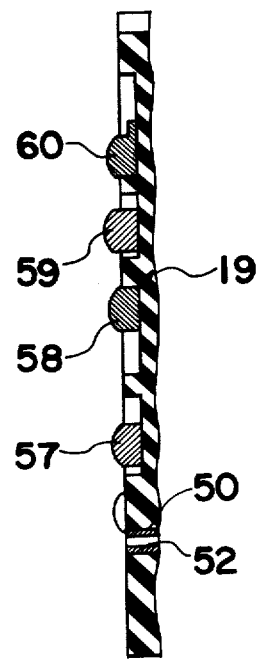
FIG. 10 is a cross sectional view taken along the line X—X in FIG. 7.
Figure 11:
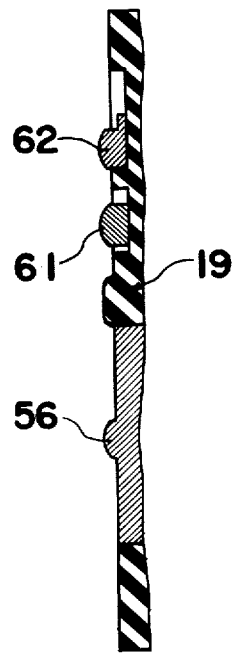
FIG. 11 is a cross sectional view taken along the line XI—XI in FIG. 7.
Figure 12:
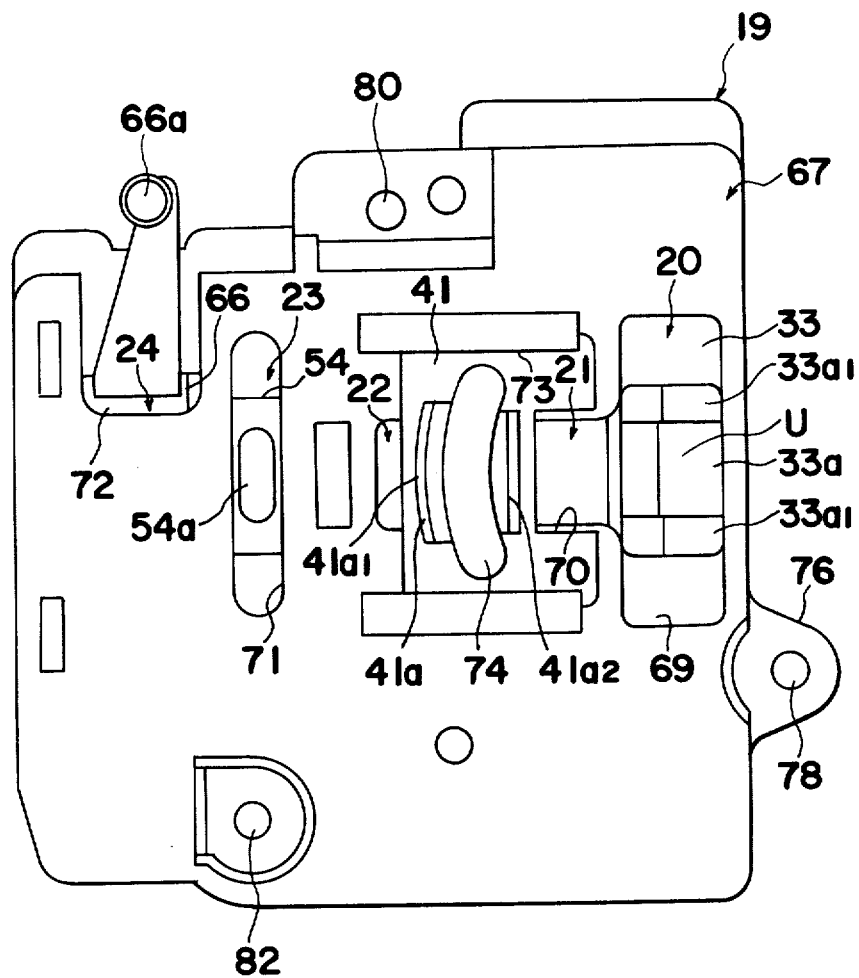
FIG. 12 is a top plan view of the switch unit of FIG. 6, with the switch cover applied thereon.

The turn signal switch 23 includes a stationary contact piece 50, stationary contact pieces 51 and 52, and an actuating piece 54 having a movable contact piece 53 for alternately causing stationary contact pieces 51 and 52 to contact with stationary contact piece 50, and arranged to be movable in the vertical direction in FIG. 16, while the hazard switch 24 is composed of terminal portions 55, 56 and 57 at the respective stationary contact pieces 50, 51 and 52 of the turn signal switch 23, suitable terminal plates 58, 59, 60, 61 and 62 provided in addition to such terminal portions, and an actuating piece 66 having movable contact pieces 63, 64 and 65 for suitably connecting the above switch elements and movably provided in the vertical direction in FIG. 17, with the terminal portion 55 being connected to the power source through a flasher (not shown), the terminal portion 56 being connected to the small lamps for a right turn indication, and the terminal portion 57 being connected to the small lamps for a left turn indication. Additionally, the terminal portions 55, 56 and 57, and also the terminal plates 58, 59, 60, 61 and 62 respectively have projections equivalent to stationary contact pieces as shown in FIGS. 10 and 11.

Figure 5:
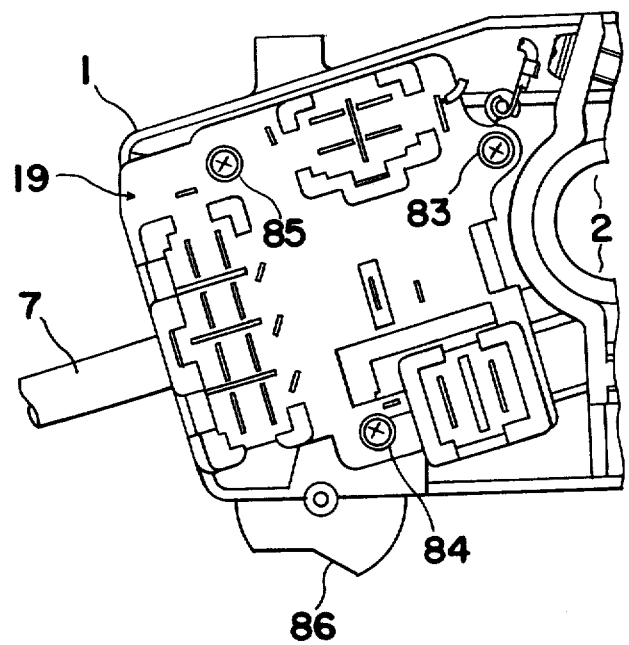
FIG. 5 is a fragmentary bottom plan view of the switching arrangement of FIG. 3.
Figure 6:
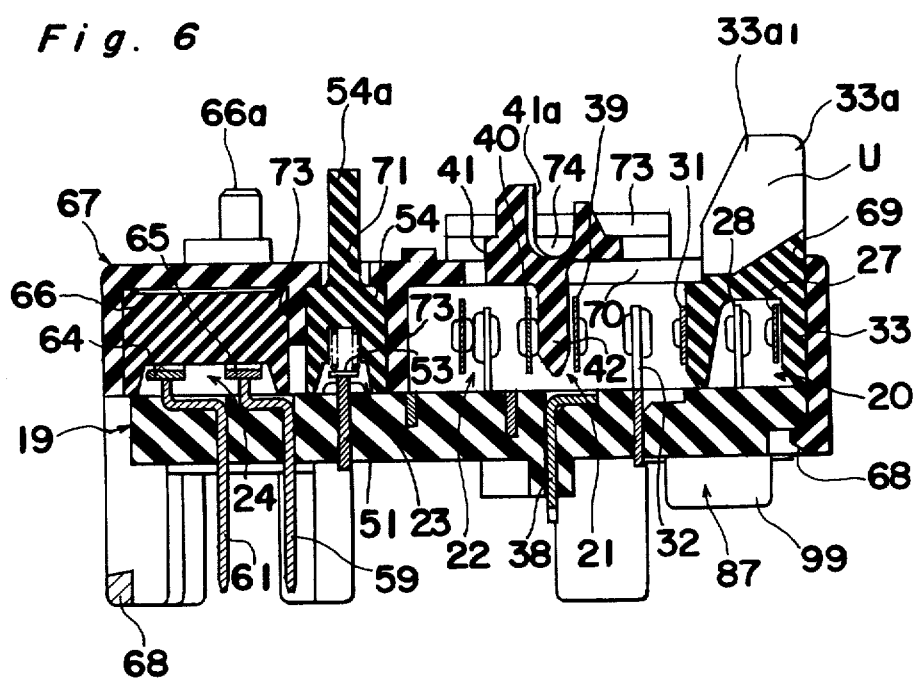
FIG. 6 is a side sectional view showing, on a further enlarged scale, the construction of a switch unit directly related to the present invention and employed in the switching arrangement of FIG. 3.

On the other hand, the switch cover 67 made, for example, of synthetic resin is provided with a plurality of claws 68 (FIG. 13), around its peripheral edge, integrally formed therewith for being detachably mounted onto the switch base 19 through engagement of claws 68 with the switch base 19 so as to cover the switch elements described in the foregoing. The switch cover 67 is also formed with openings 69, 70, 71 and 72 (FIG. 12) for allowing the respective actuating pieces 33, 41, 54 and 66 to pass therethrough in the direction of movements of actuating pieces 33, 41, 54 and 66, while at under surfaces and upper surfaces of openings 69, 70, 71 and 72, there are formed a corresponding number of ribs 73 (FIG. 6) for respectively guiding the movements of the actuating pieces 33, 41, 54 and 66. Accordingly, through openings 69, 70, 71 and 72, portions to be actuated or follower portions 33a, 41a, 54a and 66a of the respective actuating pieces 33, 41, 54 and 66 extend outwardly without being covered by the switch cover 67, among which the follower portion 33a further includes a pair of oposed projections 33a1 vertically arranged and defining a recess U therebetween for movably receiving therein the first actuating member 13 of the control shaft 11, and the follower portion 41a has another pair of opposed projections 41a1 and 41a2, with an arcuate groove 74 being formed therebetween for slidably receiving therein the second actuating member 15 described earlier. The follower portion 54a is in the form of a projection having an elliptic cross section, while the follower portion 66a is in the form of a projection of a generally circular cross section. The switch base 19 further has a fixing portion 75 laterally extending from one side thereof (FIG. 7), while the switch cover 67 is also formed with a fixing portion 76 in a position corresponding to fixing portion 75 of the switch base 19, with fixing portions 75 and 76 being formed with corresponding screw inserting holes 77 and 78. The switch base 19 and switch cover 67 are further formed with corresponding screw inserting holes 79 and 80, and 81 and 82. For assembly, the switch base 19 and switch cover 67 combined with each other to form the switch unit SW1 as described earlier is applied to the undersurface of the support frame 1 as shown in FIG. 4, and the screws 83, 84 and 85 respectively passed through the inserting holes 77 and 78, 79 and 80, and 81 and 82 as in FIG. 5 are tightened for detachably mounting the switch unit SW1 onto the support frame 1 so as to constitute the combination switching arrangement CS on the whole. In the above case, the follower portion 33a is associated with the first actuating member 13 which is movably received in the recess U defined between the projections 33a1 thereof, the follower portion 44a is associated with the second actuating member 15 which is slidably received in the arcuate groove 74 formed between the opposed projections 41a1 and 41a2, and the follower portion 54a is associated with the third actuating member 18 as described earlier, while the follower portion 66a is associated with a pushbutton knob 86 rotatably mounted to the support frame 1 separately from the control lever 7 and control shaft 11.

In the combination switching arrangement described in the foregoing according to the present invention, since the functions thereof are described in detail, for example, in Japanese Utility Model Application Jikkai-sho No. 54-7473, detailed description thereof is abbreviated herein for brevity, although the function of the light switch 20 related to the present invention will be described in detail later.

The portion of the combination switching arrangement CS directly related to the present invention will be described hereinbelow.

Figure 18:
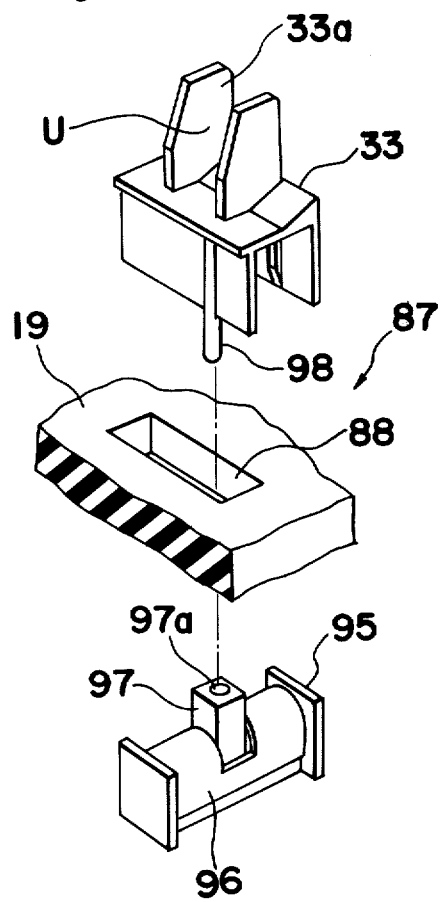
FIG. 18 is an exploded perspective view, partly broken away, of a retractor switch portion employed in the switch unit of FIG. 6.
Figure 19:
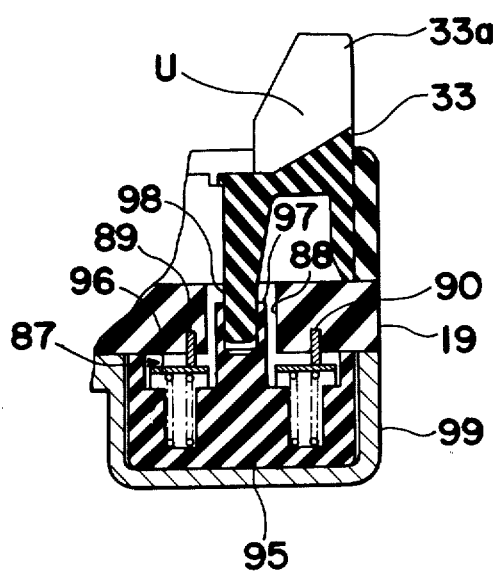
FIG. 19 is a fragmentary side sectional view of the retractor switch portion of FIG. 18 in the assembled state.

Referring particularly to FIGS. 18 and 19, there is shown a switch 87 forming part of the so-called retractor device, which is arranged to cause the head lamps provided at the forward portion of a motor vehicle (not shown), to be selectively projected from or retracted into the forward portion through a retraction mechanism (not shown), and which is normally provided with a switch for operating the retractor device irrespective of the light switch and another switch for automatically projecting the head lamps when the light switch is set at the small lamp position or head lamp position and for automatically retracting the head lamps when the light switch is set at the OFF position. The retractor switch 87 mentioned earlier is equivalent to the latter type of switch described above.

Figure 13:
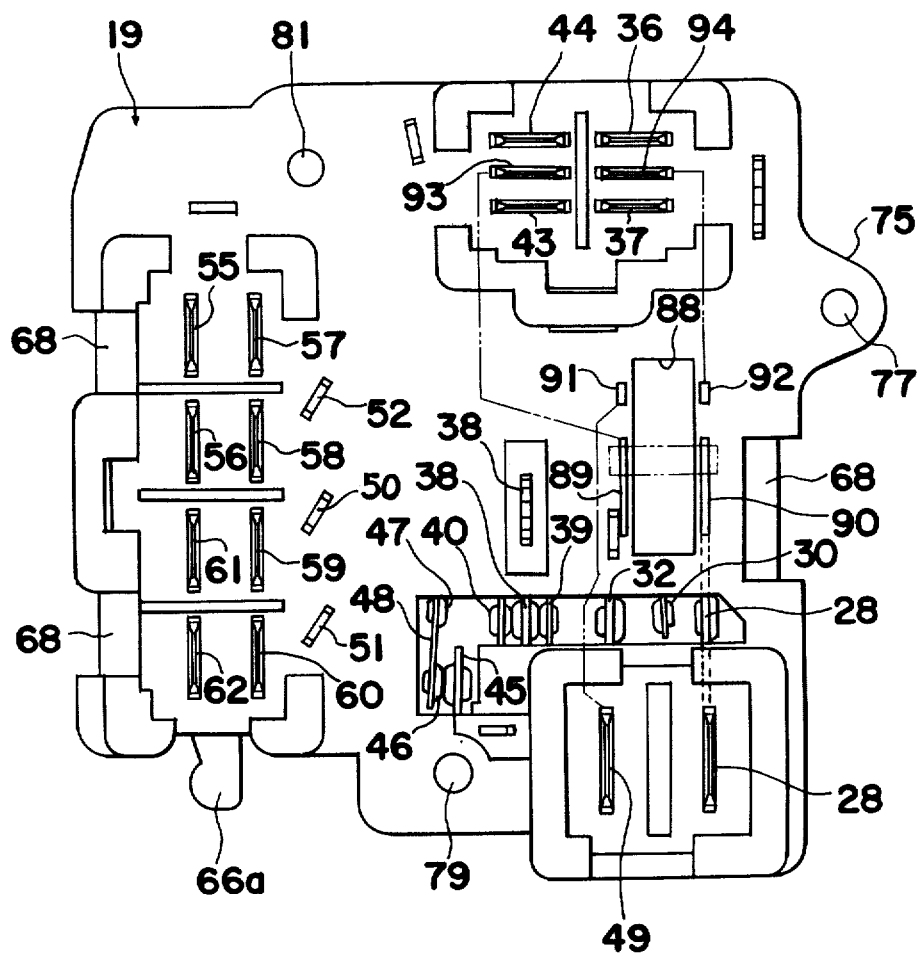
FIG. 13 is a bottom plan view of the switch unit of FIG. 12.

More specifically, the retractor switch portion 87 generally includes a communicating portion, for example, a guide elongated opening 88 formed in the switch base 19 in the region of movement of the actuating piece 33 described earlier, stationary contacts 89 and 90 provided at confronting positions through the elongated opening 88 on the surface of the switch base 19 opposite to the surface thereof where the light switch 20, dimmer switch 21, passing switch 22, turn signal switch 23 and hazard switch 24 are provided, i.e. on the reverse surface of switch base 19, and another set of stationary contacts 91 and 92 (FIG. 13) provided at positions spaced from stationary contacts 89 and 90 in the direction of movement of the actuating member 33, with the stationary contacts 89 and 92 being electrically connected respectively to a projecting instruction terminal 93 and a retraction instruction terminal 94 in the switch base 19 as shown by chain lines in FIG. 13, while the stationary contacts 90 and 91 are also electrically connected respectively to the stationary contact plate 28 and terminal plate 49 equivalent to the terminals at the power source side in the switch base 19. More particularly, as shown in FIGS. 18 and 19, there is provided a retractor switch actuating piece 95, which includes a movable contact 96 for establishing the state of switching ON by shortcircuiting between the stationary contacts 89 and 90, and also between the stationary contacts 91 and 92 through sliding movement thereof, and a connecting stud portion 97 extending upwardly from an intermediate portion of the contact 96. The actuating piece 95 as described above is disposed at the reverse surface of the switch base 19, with the connecting stud portion 97 being positioned within the guide opening 88, while a pin 98 extending downwardly from the actuating piece 33 for the light switch 20 is releasably inserted into an opening 97a formed in the connecting stud portion 97. There is further provided an actuating piece retaining cover 99 mounted to the reverse surface of the switch base 19 by a screw (not shown) or the like so as to movably surround and retain the actuating piece 95.

In the above arrangement, upon rotation of the control shaft 11 by the lighting control knob 12 described with reference to FIGS. 1 to 4, the actuating piece 33 is displaced together with the actuating piece 95 in the vertical direction in FIG. 14 through the first actuating member 13 movably received in the recess U of the follower portion 33a of actuating piece 33, while, upon rotation of the control lever 7 in the upward and downward direction in FIG. 4 (i.e. in the direction of or against the arrow A) for operation, the actuating piece 41 is displaced laterally in FIG. 15 through the second actuating member 15 slidably received in the arcuate groove 74 formed in the follower portion 41a of the actuating piece 41. Meanwhile, upon rotation of the control lever 7 laterally, i.e. in the direction of or against the arrow B in FIG. 3, the actuating piece 54 is displaced vertically in FIG. 16 through the third actuating member 18 associated with the follower portion 54a of the actuating member 54, and the actuating member 66 is moved vertically in FIG. 17 through the follower portion 66a thereof upon rotation of the pushbutton knob 86.

Firstly, with reference to lighting control, when the control shaft 11 is turned by the knob 12 from the OFF position A1 to the small lamp position A2 (FIG. 3), the actuating piece 33 associated with the first actuating member 13 is shifted from the position shown by sold lines to that shown by chain lines in FIG. 14, thus causing the movable contact plate 27 to contact the stationary contact plate 28 by the projecting portion 34 so as to illuminate the small lamps. Subsequently, upon setting of the control shaft 11 to the head lamp position A3, the actuating piece 33 is further shifted downwardly from the position shown by the chain lines in FIG. 14, and causes the movable contact plate 31 to contact the stationary contact plate 32 by the projecting portion 35 thereof, with the movable contact plate 27 being kept in contact with the stationary contact plate 28 by the projecting portion 34 of the actuating piece 33, whereby the head lamps are lit in addition to the small lamps. In association with the functions of the light switch 20 as described above, the actuating piece 95 of the retractor switch 87 is moving together with the actuating piece 33 of the light switch 20, and upon setting the knob 12 to the OFF position A1, the movable contact 96 of the actuating piece 95 shortcircuits the stationary contacts 91 and 92, whereby the power supplied to the terminal plate 49 is output to the retraction instruction terminal 94 as a head lamp retraction instruction signal, and upon setting the knob 12 to the small lamp position A2 and the head lamp position A3, the movable contact 96 also shortcircuits other stationary contacts 89 and 90 so as to develop the power led to the stationary contact plate 28, at the terminal 93, as a head lamp projecting instruction signal.

Referring particularly to FIGS. 20 to 25, there are shown one embodiment of a cord holder for holding the cord (not shown) of a connector to be connected to a socket of the switch by the support frame or column body 1, and further modifications of such cord holder.

Figure 20:
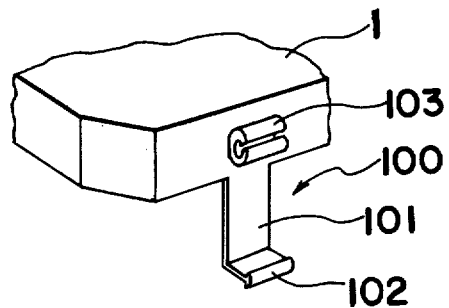
FIGS. 20 and 21 are fragmentary perspective views showing one preferred embodiment of a cord holder to FIG. 22 is a view similar to FIGS. 20 and 21, which particularly shows a modification thereof.
Figure 21:
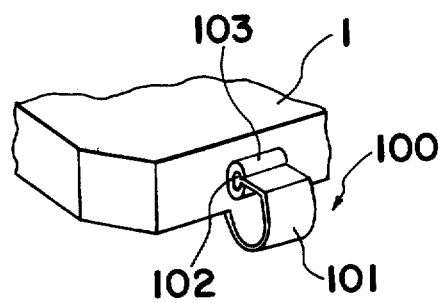

In the embodiment of FIGS. 20 and 21, the cord holder 100 includes a band portion 101 having an engaging projection 102 formed at its end, and an engaging recess 103, which are integrally formed with the support frame 1 as shown. For holding the cord (not shown), the engaging projection 102 is fitted into the corresponding engaging recess 103 as shown in FIG. 21, with the cord (not shown) being held between the band portion 101 and the corresponding edge of the support frame 1.

Figure 22:
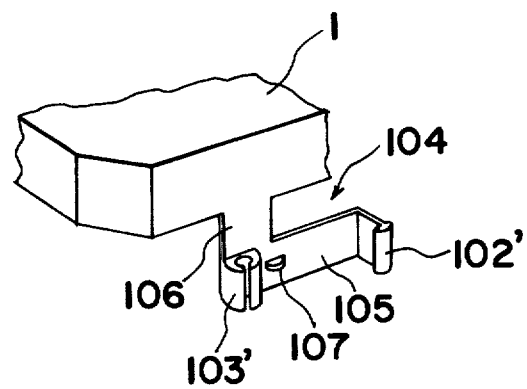

In the modification of FIG. 22, the band portion 105 of the cord holder 104 is integrally formed with the end portion of a tongue piece or support piece 106 extending downwardly from the support frame 1 so as to be directed in a direction normal to the direction of the tongue piece, while an engaging projection 102' and engaging recess 103' are respectively formed at opposite ends of band portion 105, with another projection 107 being provided on the band portion 105 for being pressed against the side of the cord during holding.

Figure 23:
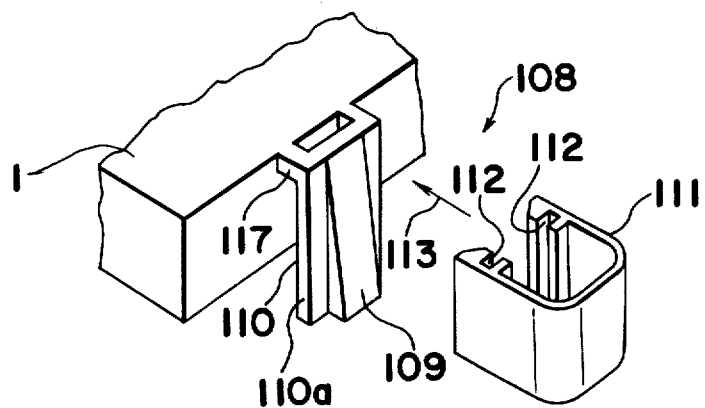
FIG. 23 is a view similar to FIGS. 20 and 21, which particularly shows another modification thereof.
Figure 24:
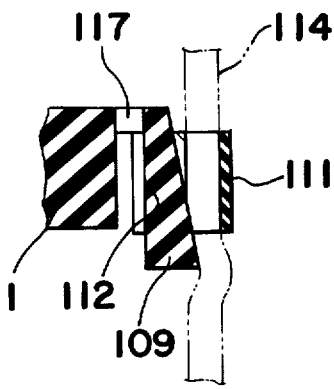
FIG. 24 is a fragmentary cross sectional view of the modified cord holder of FIG. 23.

In another modification shown in FIGS. 23 and 24, the cord holder 108 includes a cord receiving piece 110 having a tapered wedge portion 109 thereon and integrally formed with one side edge of the support frame 1, a clamp piece 111 of U-shaped cross section, for example of plastic material, which has engaging grooves 112 formed in the inner sides of corresponding opposed end portions of clamp piece 111, and resiliently fitted onto corresponding side edges 110a of the cord receiving piece 110 through depression of the clamp piece 111 in the direction of the arrow 113 in FIG. 23, and stopper portions 117 formed on the upper part of the cord receiving piece 110 for preventing the clamp piece 111 from slipping off upwardly. In the engaged state as shown in FIG. 24, the cord 114 is held between the tapered surface of the wedge portion 109 and the inner surface of the clamp piece 111 by moving the clamp piece 111 downwardly.

Figure 25:
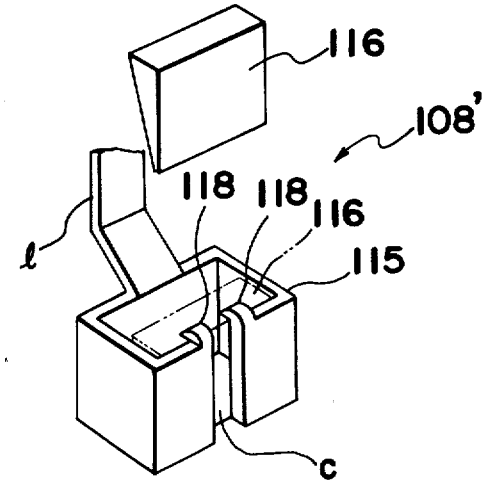
FIG. 25 is a view similar to FIGS. 20 and 21, which particularly shows a further modification thereof.

In a further modification shown in FIG. 25, the cord holder 108' includes a hollow cord holding box 115 of generally rectangular cross section integrally formed with the support frame 1 through a tongue piece or support piece l and having a cut portion c in one side for passing the cord therethrough, a wedge piece 116 to be forced into the cord holding box 115 after passing the cord into the box 115, and a pair of projections or stoppers 118 formed at one upper edge of the box 115 for preventing the wedge piece 116 from slipping off the cord holding box.

As is clear from the foregoing description, according to the present invention, favorable effects as follows can be expected. More specifically, in the case where various switches such as a light switch, dimmer switch, passing switch, turn signal switch, hazard switch, retractor switch, etc. are formed into a unit, with the switch elements to be selectively opened and closed by corresponding actuating pieces being secured to one switch base, if the group of the switches are disposed only on one surface of the switch base, such switch base undesirably becomes bulky and has a large surface area, since the moving strokes of the respective actuating pieces must be accommodated in only the one surface of the switch base. However, according to the arrangement of the present invention, since it is so arranged that the switch elements (for example, the stationary contacts of the retractor switch) are secured to the reverse surface of the switch base together with the actuating pieces therefor, the size of the switch base is not increased, even when the number of switches is increased, and thus, compact size of the switching arrangement may be achieved simultaneously with the formation thereof into the unit of the switching members. Furthermore, in the arrangement according to the present invention, since the actuating pieces located at the upper surface of the switch base and those provided at the reverse surface of the switch unit are coupled to each other through communication portions such as an elongated opening, etc., formed in the switch base, the operating mechanisms for the actuating pieces have only to be provided with respect to the actuating pieces at one surface of the switch base, and thus, overall complication of the construction is advantageously prevented.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A combination switching arrangement for use in a motor vehicle and the like and comprising:
   a support frame;
   a lever support member pivotally mounted to said support frame;
   a control level member pivotally mounted to said lever support member;
   said control level member having a control shaft extending axially therethrough and said control shaft being rotatable about the longitudinal axis of said control level member;
   said control shaft carrying a first actuating member;
   said control level member carrying a second actuating member and being pivotally movable relative to said lever support member about a second axis;
   said lever support member carrying a third actuating member and being pivotally movable relative to said support frame about a first axis;
   a switching unit mounted on said support frame and having a switch base having at a first surface thereof said control lever member, said control shaft and said first, second and third actuating members and carrying on said first surface a plurality of switching elements to be selectively opened and closed by operation of said first, second and third actuating members;
   first, second and third actuating pieces mounted on said first surface of said switch base and operable by said first, second and third actuating members, respectively, to open and close respective of said switching elements;
   an additional switching element mounted on a second surface of said switch base, opposite to said first surface thereof;
   a fourth actuating piece having a bridging contact mounted thereon and disposed on said second surface of said switch base; and
   said fourth actuating piece and one of said first, second and third actuating pieces having portions mechanically coupled through an aperture formed in said switch base, such that motion of said one actuating piece in use is transmitted to said fourth actuating piece to selectively open or close said additional switching element.

2. A combination switching arrangement as claimed in claim 1, wherein said switch unit is arranged to effect direction indication, upon rotation of said control lever member about said first axis, through said third actuating member associated with a corresponding actuating piece, and dimmer and passing indication, upon rotation of said control lever member about said second axis, through said second actuating member associated with another said corresponding actuating piece, and lighting control and head lamp reactor control, upon rotation of said control lever member about said longitudinal axis thereof, through said first actuating member associated with said one actuating piece.

3. An electrical switching arrangement as claimed in claim 1, further comprising an auxiliary control lever member rotatably provided on said support frame for pivotal movement about a first support axis and about a second support axis directed in a direction different from that of said first support axis, and another switch unit having a wiper switch element associated with said auxiliary control lever member so as to be actuated upon rotation of said auxiliary control lever member about said first support axis, a washer switch element associated with said auxiliary control lever member through a depressing rod member so as to be actuated by said depressing rod member upon rotation of said auxiliary control lever member about said second support axis, and a hazard switch element for hazard indication to be operated by a separate pushbutton knob provided on said support frame.

4. A combination switching arrangement as claimed in claim 1, further including a cord holding member for holding a connector cord to be connected to said switch unit, said cord holding member being integrally formed with said support frame.

5. A combination switching arrangement as claimed in claim 4, wherein said cord holding member includes a band portion to be directed around the cord, said band portion extending outwardly from one side edge of said support frame and having at one end thereof an engaging portion engageable with a corresponding recess portion integrally formed with said one side edge of said support frame.

6. A combination switching arrangement as claimed in claim 4, wherein said cord holding member includes a tongue piece extending outwardly from one side edge of said support frame and a band portion to be directed around the cord, said band portion being provided at an end portion of said tongue piece so as to extend in a direction intersecting that of said tongue piece, said band portion having an engaging portion at one end thereof and a recess portion engageable with said engaging portion at another end thereof, with another projection being formed on said band portion.

7. An electrical switching arrangement as claimed in claim 4, wherein said cord holding member includes a cord receiving piece having a tapered wedge portion thereon and integrally formed with one side of said support frame, a clamp piece of U-shaped cross section to be directed around the cord, said clamp piece having engaging grooves formed in the inner sides of corresponding end portions thereof and resiliently engageable with corresponding side edges of said cord receiving piece, and stopper portions formed in said cord receiving piece for preventing said clamp piece from slipping off said cord receiving portion upon engagement between said engaging grooves of said clamp piece and said side edges of said cord receiving piece, with the cord held between said clamp piece and said wedge portion of said cord receiving piece.

8. An electrical switching arrangement as claimed in claim 4, wherein said cord holding member includes a hollow cord holding box of rectangular cross section integrally formed with an end portion of a tongue piece extending outwardly from one side edge of said support frame and having a cut portion in one side thereof for passing the cord therethrough, and a wedge piece to be forced into the cord holding box, and stoppers formed on one edge of said cord holding box for preventing said wedge piece from slipping off said cord holding box.

* * * * *